United States Patent

[11] 3,628,008

| [72] | Inventor | Benjamin R. Lacey<br>2743 North Ringgold St., Philadelphia, Pa. 19132 |
|---|---|---|
| [21] | Appl. No. | 843,980 |
| [22] | Filed | July 23, 1969 |
| [45] | Patented | Dec. 14, 1971 |

[54] BRAKE WEAR INDICATOR
4 Claims, 4 Drawing Figs.

[52] U.S. Cl. .................................................. 340/52 A,
340/69, 188/1 A, 200/61.4
[51] Int. Cl. ...................................................... B60t 17/22
[50] Field of Search ............................................ 200/61.4;
188/1 A; 340/52, 69

[56] References Cited
UNITED STATES PATENTS

| 2,217,176 | 10/1940 | Madison ........................ | 340/52 A |
| 3,282,241 | 11/1966 | Forbush ....................... | 188/1 A |
| 3,339,676 | 9/1967 | Quinn ........................... | 188/1 A |

Primary Examiner—John W. Caldwell
Assistant Examiner—William M. Wannisky

ABSTRACT: A brake wear indicator for use in a self-adjuster brake assembly which includes the actuator associated with a brakeshoe, with the actuator arm turning the adjusting screw from time to time to achieve the self-adjusting action. With the present invention there is provided a movable terminal that is moved from time to time by the actuator arm and a fixed terminal that is mounted on the brakeshoe. As the brake linings wear away, the actuator screw is caused by the actuator arm to be rotated from time to time and with each advance of the actuator screw the movable terminal of the present invention is advanced toward the fixed terminal. At a predetermined amount of wear of the brake lining the movable terminal comes into contact with the fixed terminal to close a circuit that turns on a warning light that is preferably located on the dashboard of an automobile to warn the driver that the time has come to replace the brake lining of the automobile.

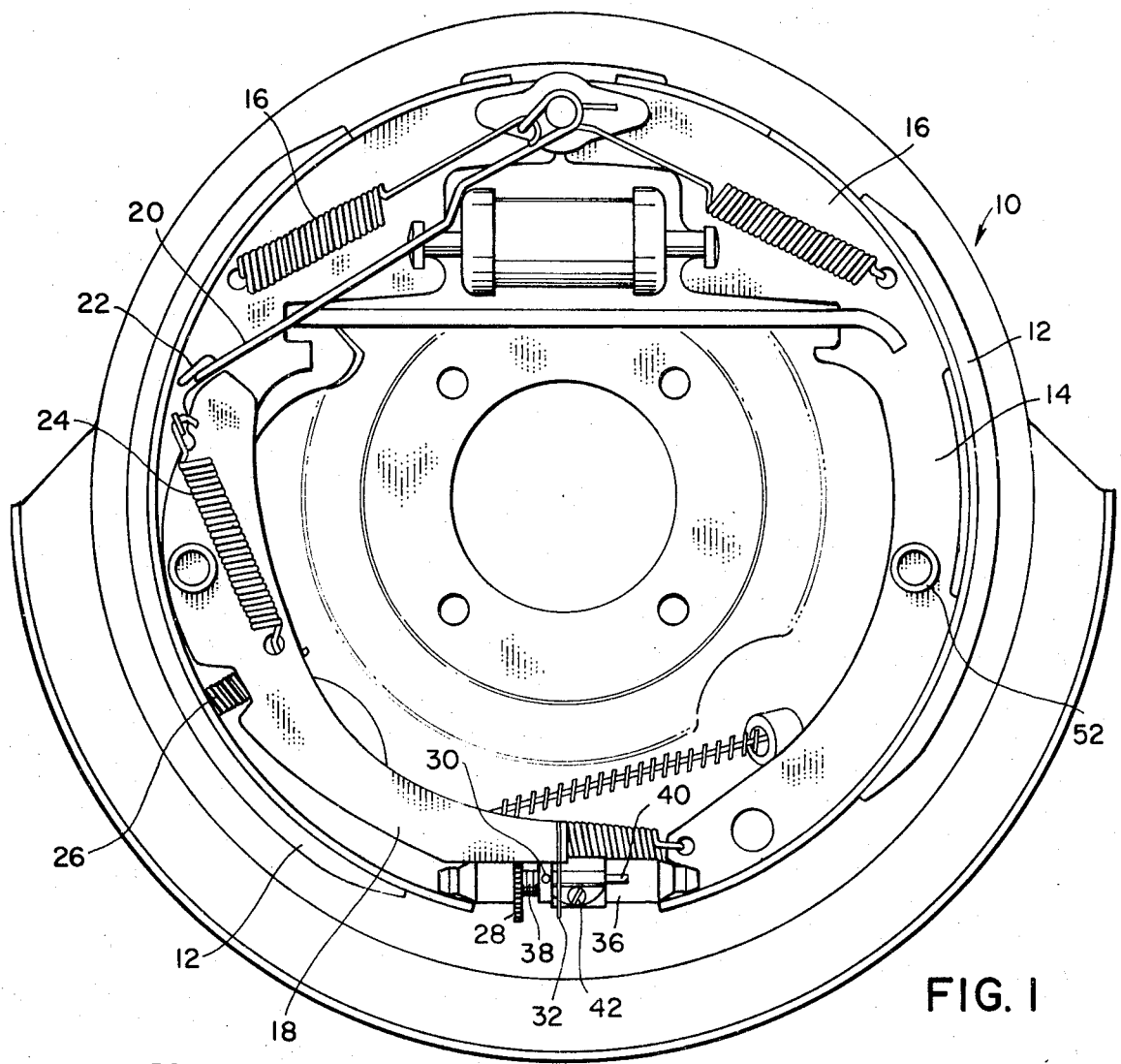
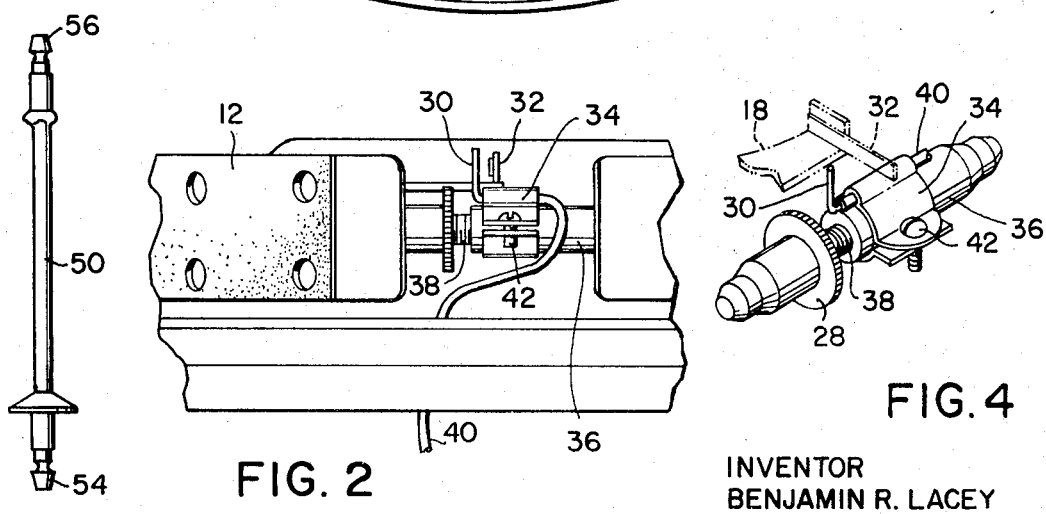
FIG. 1
FIG. 2
FIG. 3
FIG. 4
INVENTOR
BENJAMIN R. LACEY
BY
ATTORNEY

BRAKE WEAR INDICATOR

This invention relates to a brake wear indicator and has as its objective the provision of a new and improved device of this general class.

It is known that the brake linings of an automobile, or other vehicle will gradually become worn, and a time is reached when the linings must be replaced. In present practice it is necessary for a mechanic to remove the wheels of the automobile and make an actual visual inspection of the brake linings to determine whether they still have sufficient thickness to provide safe stopping or whether the time has come to replace such brake linings. This visual inspection is not only time consuming, but requires thoughtfulness on the part of the driver to request that such visual inspection be made. Even in many states which by law require automobile inspection, such inspection occurs at only two or three times each year. Thus, there is nothing requiring the driver to conduct a visual inspection between the times that the law requires him to do so. In view of this it is quite possible that the brake linings may become worn beyond the crucial point prior to the next inspection required by law and thus the automobile is a hazard to life and limb.

It is known that there have been prior suggestions of an indicating device or means that would tell the driver when the brake lining had become worn past the accepted minimum thickness required for safe stopping. However, most if not all of the prior devices have failed to be used on a commercial basis, and it is believed that such failure is attributable to the difficulty of incorporating such devices into conventional brake assemblies.

In recent years brake systems have employed self-adjuster assemblies which become operative only when the brakes are applied while the car is moving in a rearward direction. The present invention arises from the recognition that the conventional self-adjuster assembly lends itself to the acceptance of a brake wear indicator of the present invention in a simple and inexpensive manner.

It is therefore an object of the present invention to provide a brake wear indicator that can be simply and easily incorporated into a self-adjuster assembly in a very quick and efficient manner.

The foregoing as well as other objects of the invention are achieved by providing a self-adjuster assembly which includes an actuator arm which from time to time will cause rotation of an adjusting screw, as well as the usual brake linings. With the present invention a movable terminal is conveniently attached to the adjusting screw with the movable terminal advancing with the adjusting screw. A fixed terminal is attached in predetermined relationship to the movable terminal, with the fixed terminal being attached to the actuator arm. Thus, as the brake shoes wear, the adjusting screw will be caused to advance from time to time. This causes the movable terminal of the present invention to move toward the fixed terminal. At a predetermined degree of brake lining wear, the movable terminal meets the fixed terminal to close a circuit which turns on a warning light that is mounted upon the dashboard of an automobile. In this way the driver is warned that the brake linings are now worn down to minimum or near minimum acceptable thickness, and that such brake linings should be replaced.

Other objects and many of the intended advantages of the invention will become clear by reference to the following drawings and written descriptions wherein:

FIG. I is a plan view showing a self-adjuster assembly equipped with the brake wear indicator of the present invention;

FIG. II is a fragmentary end view of the assembly of FIG. I taken from the bottom thereof and looking upwardly;

FIG. III is an elevational view of a connector pin that can be used to establish electrical connection where the self-adjuster assembly is furnished with a solid backing plate that will not allow passage of electrical wires; and FIG. IV is a fragmentary perspective view showing the details of the present invention.

Referring now in greater detail to the various figures of the drawings wherein like reference characters refer to like parts there is shown at (IO) in FIG. I a self-adjuster assembly incorporating the brake wear indicator of the present invention. The self-adjuster assembly is of conventional construction and no claim is made herein to any part of the self-adjuster assembly. It is rather the ability of the brake wear indicator of the present invention to be simply incorporated into the conventional self-adjuster assembly that constitutes one of the great advantages of the present invention.

It will be seen that the self-adjuster assembly 10 includes such conventional elements as brake linings 12, brakeshoes 14, brakeshoe return springs 16 actuator 18, actuator link (20), actuator pivot (22), actuator spring (24), actuator return spring (26), and the all important adjusting screw (28). All of the foregoing are of conventional construction as will appear to those skilled in the art.

As best seen in FIG. II and FIG. IV the present invention includes movable terminal (30) and fixed terminal (32). It will be seen that the movable terminal (30) extends from a bracket device (34) which encircles stem (36) of the adjusting screw (28) which is directly attached to the brakeshoe (14) as can be seen in FIG. II. Thus, as the adjusting screw (36) advances to expose additional threads (38), it will be seen that such advance necessarily requires that the terminal (30) move from left to right as seen in FIG. II toward fixed terminal (32).

It will be seen that an insulated electrical lead (40) is provided that passes through an opening in the backing plate and then into the bracket (34). The bracket (34) should be fitted with an opening which permits passage of the insulated lead from right to left as viewed in FIG. II, with the conductor of the lead (40) being electrically and mechanically attached to the terminal (30).

It will also be seen from FIG. II that the bracket (34) is essentially a closed device except for one side being open to permit the bracket to be slipped upon the stem (36), with a tightening bolt (42) being provided in order that the bracket (34) will be tightly clamped to the stem (36).

It can also be seen from FIG. II that the fixed terminal (32) may be secured to any convenient surface which is grounded. With the present invention it is preferred that the fixed terminal be secured to the actuator arm. Thus, when contact is finally made between the terminals (30) and (32) the "hot" lead (40) will be permitted to pass current to a circuit which includes a warning light (not shown) on the dashboard of an automobile. In this way the driver will be warned that the brakeshoe is approaching minimum acceptable thickness.

It can be readily seen that the spacing between the terminals (30) and (32) can be adjusted upon initial installation of the brake linings so that the gap between the terminals (30) and (32) represents the allowable amount of brake lining wear. Hence, when the brake lining has been worn down to the extent of the gap that originally existed between the terminals (30) and (32), it follows that the brake lining is close to being worn to the minimum thickness.

It sometimes occurs that in certain brake assemblies there is a solid backing plate that will not allow for the passage of a lead (40). In such a case, a pin (50) is provided that can be inserted through one of the tapped openings in the brakeshoe, such as the opening (52) as seen in FIG. I. The pin (50) is especially designed to present an insulating outer surface to the backing plate but having a conductive core. Thus, the lead (40) can be attached to the lower terminal (54) by crimping or soldering, and another lead can be attached to upper terminal (56) and then continued on the movable terminal (30). Variations of this approach will readily occur to those skilled in the art.

It is thus seen that the present invention provides a brake wear indicator that can be simply incorporated into a self-adjuster assembly without special tools or modifications of any type. The movable terminal (30) is simply mounted upon the adjusting screw (28), is the fixed terminal (32) and simply attached to the actuator arm. Thus, the brake wear indicator of the present invention can be secured at low cost to a self-adjuster assembly, either at the automobile manufacturing plant or by automotive service stores or garages.

It is thus seen that the present invention provides a brake wear indicator which can serve reliably for the life of the automobile.

Other variations of the present invention will readily occur to those skilled in the art, but it is understood that the present invention is to be interpreted by reference primarily to the attached claims, but in some cases it may become desirable to make reference to the present specification for purposes of understanding the full extent of the invention.

I claim:

1. A brake wear indicator device for use in a self-adjuster assembly including an actuator arm, a brake lining and an adjusting screw motivated by said actuator arm "through a star wheel," the improvement comprising, providing a brake wear indicator device including a bracket for securement to said adjusting screw, said bracket "having secured thereto" a movable electrode adapted to be moved together with said adjusting screw, and a fixed electrode being secured to said actuator arm, "said movable and fixed electrodes being positioned on line with said adjusting screw and star wheel, whereby as said adjusting" screw is moved, said movable electrode approaches said fixed electrode, with ultimate contact being achieved between the electrodes to close a circuit to an indicator light.

2. The brake wear indicator of claim 1 including a bracket which is adapted to be fitted upon the stem of an adjusting screw, with said bracket being provided with a tightening screw.

3. The brake wear indicator of claim 2 including a lead connecting a power source to said movable terminal.

4. The brake wear indicator of claim 1 including a conductive pin adapted to be positioned in one of the existing openings into the brakeshoe to permit electrical connection to said movable terminal in the event of a solid backing plate as a part of the said self-adjuster assembly, said pin being insulated from said shoe whereby electrical current may pass to said movable terminal.

* * * * *